(12) United States Patent  
Nakada

(10) Patent No.: US 8,094,632 B2  
(45) Date of Patent: Jan. 10, 2012

(54) RANDOM ACCESS COMMUNICATION METHOD AND MOBILE COMMUNICATION SYSTEM IN MOBILE COMMUNICATION SYSTEM

(75) Inventor: Suguru Nakada, Tokyo (JP)

(73) Assignee: NEC Corporation, Tokyo (JP)

( * ) Notice: Subject to any disclaimer, the term of this patent is extended or adjusted under 35 U.S.C. 154(b) by 848 days.

(21) Appl. No.: 11/928,334

(22) Filed: Oct. 30, 2007

(65) Prior Publication Data

US 2008/0291880 A1 Nov. 27, 2008

(30) Foreign Application Priority Data

Nov. 13, 2006 (JP) .................................. 2006-306552

(51) Int. Cl.
*H04W 4/00* (2009.01)

(52) U.S. Cl. ......... 370/338; 370/341; 370/342; 370/348

(58) Field of Classification Search .................. 370/335, 370/337, 338, 342, 348, 236, 341; 455/67.11; 375/141

See application file for complete search history.

(56) References Cited

U.S. PATENT DOCUMENTS

| | | | | |
|---|---|---|---|---|
| 4,736,371 A * | 4/1988 | Tejima et al. | ................. | 370/236 |
| 6,647,002 B1 * | 11/2003 | Suda et al. | ................. | 370/335 |
| 6,674,739 B1 * | 1/2004 | Lee et al. | ....................... | 370/342 |
| 6,674,765 B1 * | 1/2004 | Chuah et al. | ................. | 370/458 |
| 6,680,929 B1 * | 1/2004 | Iida et al. | ..................... | 370/348 |
| 6,947,469 B2 * | 9/2005 | Anderson et al. | ............. | 375/141 |
| 2006/0292992 A1 * | 12/2006 | Tajima et al. | ............... | 455/67.11 |
| 2007/0030831 A1 * | 2/2007 | Majima | ......................... | 370/337 |

FOREIGN PATENT DOCUMENTS

| | | |
|---|---|---|
| CN | 1294792 A | 5/2001 |
| CN | 1856948 A | 11/2006 |
| JP | 8181645 | 7/1996 |
| JP | 9200848 | 7/1997 |
| JP | 10173584 | 6/1998 |
| JP | 2003219458 A | 7/2003 |
| JP | 2003333661 A | 11/2003 |
| JP | 2005101990 | 4/2005 |

OTHER PUBLICATIONS

Korean Office Action for KR 10-2007-0114813 issued Sep. 21, 2009.
Chinese Office Action for CN 200710170339.6 issued Apr. 26, 2011.
Japanese Office Action for JP2006-306552 issued Jul. 6, 2011.

* cited by examiner

*Primary Examiner* — Hassan Kizou
*Assistant Examiner* — Toan Nguyen

(57) ABSTRACT

The random access communication method according to the present invention includes a mobile station transmitting a transmission continuation request signal which requests a continuation of transmission of random access data to a base station during transmission of the random access data, the base station judging, upon receiving a transmission continuation request signal from the mobile station, whether or not to permit a continuation of transmission of the random access data depending on the current communication situation, the base station transmitting a transmission continuation permission signal or a transmission continuation rejection signal to the mobile station depending on whether or not to permit the continuation of transmission of the random access data, and the mobile station continuing, upon receiving the transmission continuation permission signal from the base station, transmission of the random access data.

7 Claims, 7 Drawing Sheets

RANDOM ACCESS COMMUNICATION METHOD AND MOBILE COMMUNICATION SYSTEM IN MOBILE COMMUNICATION SYSTEM

This application is based upon and claims the benefit of priority from Japanese patent application No. 2006-306552, filed on Nov. 13, 2006, the disclosure of which is incorporated herein in its entirety by reference.

BACKGROUND OF THE INVENTION

1. Field of the Invention

The present invention relates to a technology for improving utilizaton efficiency of a radio channel for random access communication in a mobile communication system.

2. Description of the Related Art

Nowadays, a major shift in the way that information is transmitting through a mobile communication system such as a cellular phone system is the shift from speech to packet data. This is because cellular phones are provided with higher functionality, and functions such as site browsing, e-mail, camera, music/video reproduction have been successively added so that large-volume data associated with these functions is transmitted through networks.

In order to transmit such packet data from a mobile station such as a cellular phone to a base station, many mobile communication systems use a random access communication scheme. The random access communication scheme is suitable for a communication which does not have information to be continuously transmitted such as speech calls.

The random access communication scheme shares one radio channel determined by frequency, time slot, spreading code or the like among a plurality of mobile stations (e.g., see JP-A-1996-181645, JP-A-1997-200848, JP-A-1998-173584 and JP-A-2005-101990).

Therefore, to prevent a specific mobile station from occupying a radio channel for a long time, when the size of random access data is large, the mobile station divides the data into portions of a predetermined data length and transmits the divided random access data to the base station after an interval.

For example, a mobile communication system based on a W-CDMA (Wideband Code Division Multiple Access) scheme is provided with a radio channel called PRACH (Physical Random Access Channel) as a radio channel for random access communication.

Here, the random access communication method in a related mobile communication system will be explained with reference to FIG. 1 and FIG. 2.

Referring to FIG. 1 and FIG. 2, when random access data to be transmitted to a base station is produced in step 801, a mobile station sends a transmission start request signal prearranged with the base station to the base station before transmitting random access data in step 802.

When the transmission start request signal is received from the mobile station in step 803, the base station judges whether or not to permit transmission of the random access data in step 804 and transmits a transmission start permission signal or a transmission start rejection signal to the mobile station according to the judgment result in steps 805 and 806.

When a transmission start rejection signal is received from the base station (in the case of situation [A] in FIG. 1) in step 807 or when a transmission start permission signal cannot be received from the base station after a lapse of a predetermined time in step 809, the mobile station repeatedly transmits a transmission start request signal to the base station until it can receive a transmission start permission signal.

On the other hand, when a transmission start permission signal is received from the base station in step 808 (in the case of situation [B] in FIG. 1), the mobile station starts transmission of random access data of a predetermined data length to the base station in step 810. The base station performs reception processing on the random access data in step 811.

When the transmission of the random access data of the predetermined data length is completed in step 812, the mobile station stops the transmission temporarily in step 813. In that case, when there still remains some random access data in the mobile station in step 814, the mobile station repeatedly transmits a transmission start request signal to the base station until it can receive a transmission start permission signal again from the base station.

Hereinafter, the above described processing is repeated and transmission of the random access data from the mobile station is completed when there remains no more random access data in step 815.

In the above described random access communication method, the mobile station and the base station must communicate about permission or rejection for a transmission start every time the mobile station transmits random access data of a predetermined data length to the base station. However, there can also be cases where no mobile station is transmitting random access data while these exchanges are being carried out.

However, in order to efficiently transmit the increasing amount of packet data daily, it is necessary to efficiently use a radio channel for random access communication and to reduce the time during which no mobile station is transmitting data as much as possible. Furthermore, mobile stations also require that random access data be transmitted as early as possible.

SUMMARY OF THE INVENTION

Therefore, it is an object of the present invention to provide a random access communication method in a mobile communication system and to provide a mobile communication system capable of improving utilization the efficiency of a radio channel for random access communication.

In order to attain the above described object, the random access communication method of the present invention is a random access communication method in a mobile communication system made up of a base station and a plurality of mobile stations which carry out a random access communication with the base station, including a mobile station transmitting a transmission continuation request signal which requests a continuation of transmission of the random access data to the base station during transmission of the random access data, the base station judging, when the transmission continuation request signal is received from the mobile station, whether or not to permit the continuation of transmission of the random access data depending on the current communication situation, the base station transmitting a transmission continuation permission signal or a transmission continuation rejection signal to the mobile station depending on whether or not to permit the continuation of transmission of the random access data, and the mobile station continuing, when the transmission continuation permission signal is received from the base station, the transmission of the random access data.

In order to attain the above described object, the mobile communication system of the present invention is a mobile communication system comprising a base station and a plurality of mobile stations which carry out a random access communication with the base station, wherein the mobile station including a mobile station communication section for carrying out a radio communication with the base station, and mobile station random access controller for controlling the mobile station communication section during transmission of the random access data, for transmitting a transmission continuation request signal which requests a continuation of transmission of the random access data to the base station for controlling, when the mobile station communication section receives a transmission continuation permission signal which permits the continuation of transmission of the random access data from the base station, the mobile station communication section to continue transmission of the random access data, and the base station including a base station communication section which carries out a radio communication with the mobile station and a base station random access controller which judges, is when the base station communication section receives the transmission continuation request signal from the mobile station, whether or not to permit a continuation of transmission of the random access data based on the current communication situation, controls the base station communication section depending on whether or not to permit the transmission continuation, and transmits a transmission continuation permission signal or a transmission continuation rejection signal to the mobile station.

The above and other objects, features, and advantages of the present invention will become apparent from the following description with reference to the accompanying drawings which illustrate examples of the present invention.

DESCRIPTION OF THE PREFERRED EXEMPLARY EMBODIMENTS

Figure 3:
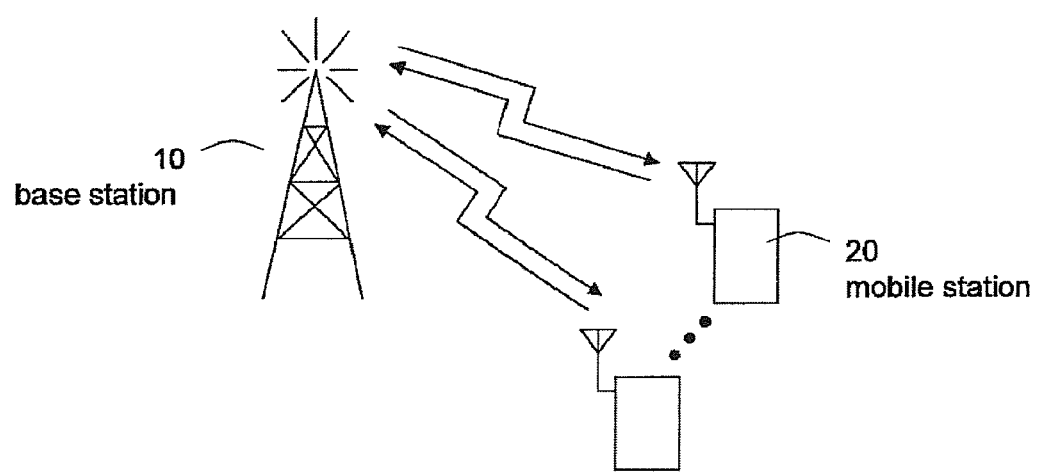
FIG. 3 shows the configuration of a mobile communication system of the present invention.

FIG. 3 shows the configuration of a mobile communication system according to an exemplary embodiment of the present invention.

Referring to FIG. 3, the mobile communication system of this exemplary embodiment includes base station 10 and a plurality of mobile stations 20.

FIG. 3 shows an example when the present invention is applied to a general cellular phone system based on a CDMA scheme but the present invention is not limited to the cellular phone system.

Furthermore, the present invention presupposes that mobile station 20 has already received a control signal including information on base station 10 from base station 10 before starting a random access communication.

Hereinafter, the random access communication method in the mobile communication system of this exemplary embodiment shown in FIG. 3 will be explained with reference to FIG. 4 to FIG. 6.

Figure 4:
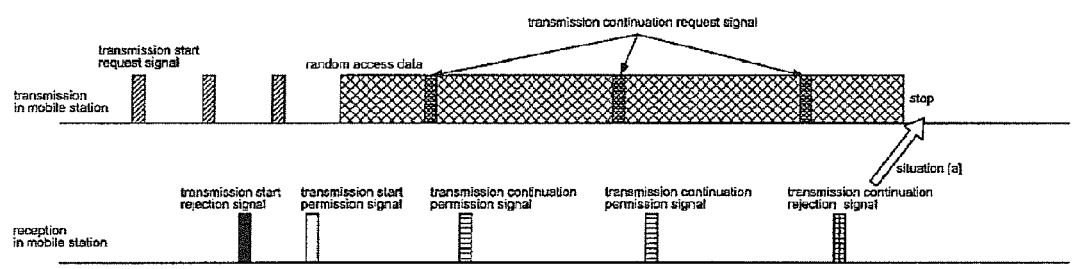
FIG. 4 illustrates an overview of the random access communication method in the mobile communication system shown in FIG. 3.
Figure 5:
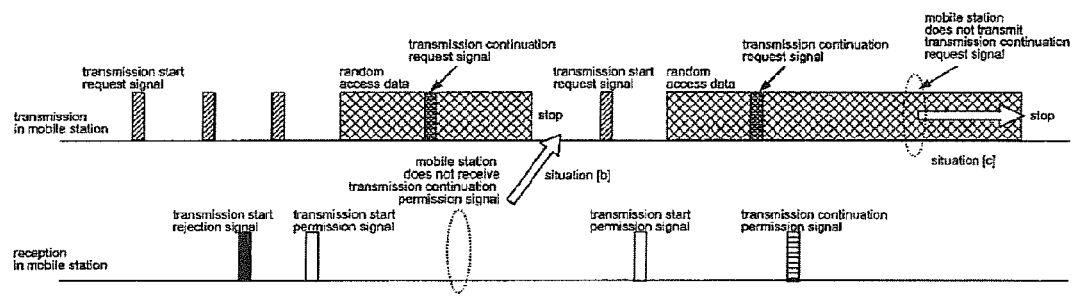
FIG. 5 illustrates an overview of the random access communication to method in the mobile communication system shown in FIG. 3.
Figure 6:
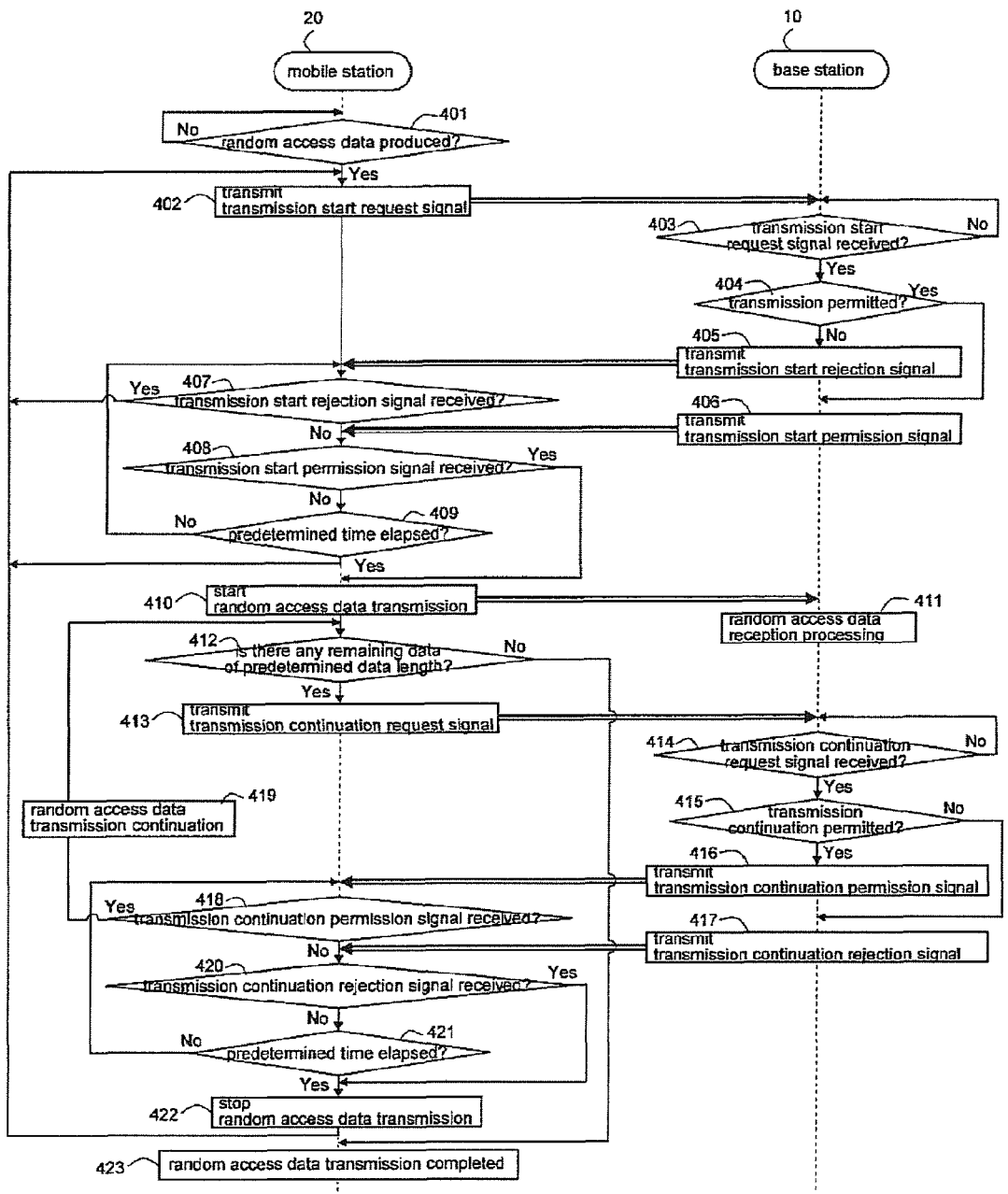
FIG. 6 is a flow chart illustrating the flow of the random access communication method in the mobile communication system shown in FIG. 3.

Referring to FIG. 4 to FIG. 6, when random access data to be transmitted to base station 10 is produced in step 401, mobile station 20 transmits a transmission start request signal prearranged with base station 10 to base station 10 before transmitting the random access data in step 402.

Upon receiving the transmission start request signal from mobile station 20 in step 403, base station 10 judges whether or not to permit transmission of the random access data in step 404 and transmits a transmission start pemission signal or transmission start rejection signal to mobile station 20 depending on the judgment result in steps 405 and 406.

When the transmission start rejection signal is received from base station 10 in step 407 or when it is not possible to receive any transmission start permission signal from base station 10 after a lapse of a predetermined time in step 409, mobile station 20 repeatedly transmits a transmission start request signal to base station 10 until it can receive a transmission start permission signal from base station 10.

On the other hand, when a transmission start permission signal is received from base station 10 in step 408, mobile station 20 starts transmission of random access data of a predetermined data length to base station 10 in stop 410. Base station 10 performs reception processing on the random access data in step 411.

Figure 1:
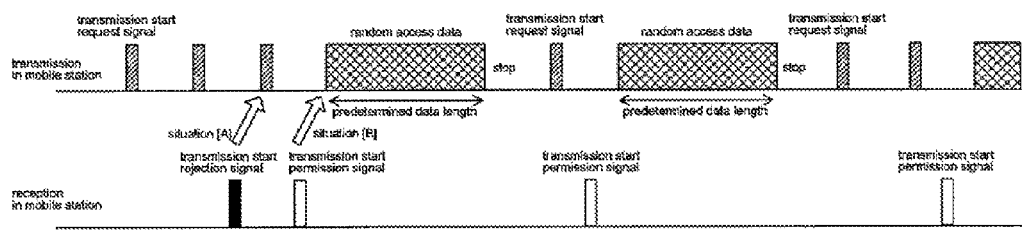
FIG. 1 illustrates an overview of a random access communication method in a related mobile communication system.
Figure 2:
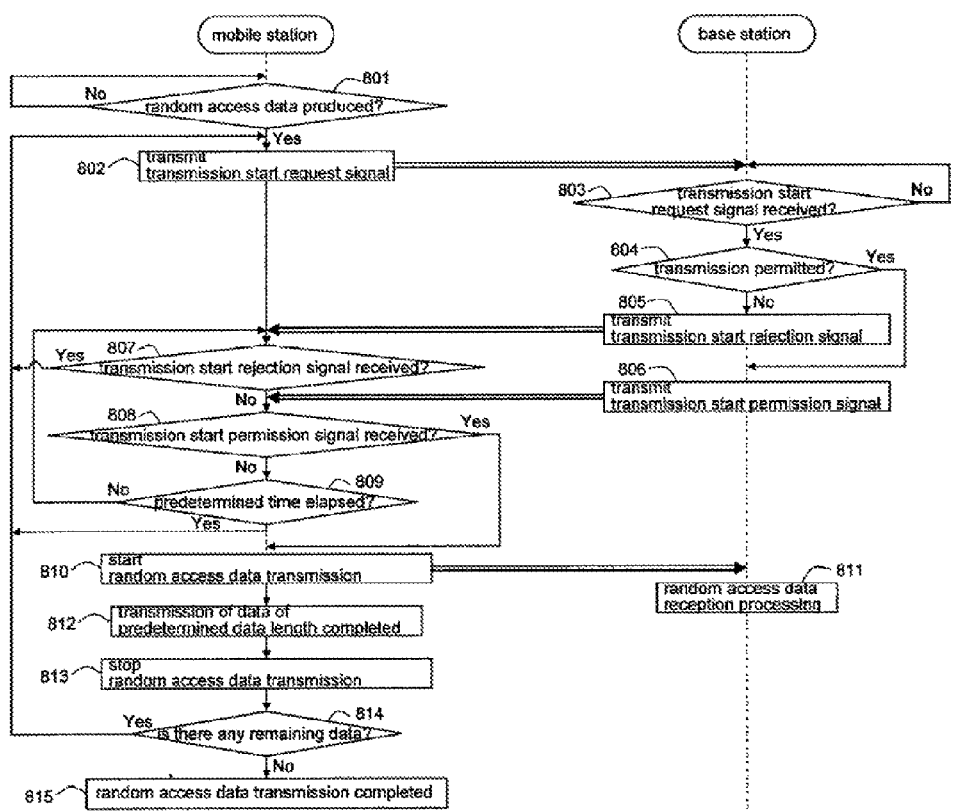
FIG. 2 is a flow chart illustrating the flow of the random access communication method in the related mobile communication system.

The above described processing is common to the random access communication method shown in FIG. 1 and FIG. 2.

Next, in step 412, mobile station 20 judges, even after transmission of random access data of the predetermined data length, currently being transmitted, is completed, whether or not there still remains random access data of a predetermined data length or longer in mobile station 20. When there still remains data of the predetermined data length or longer, mobile station 20 transmits a transmission continuation request signal prearranged with base station 10 during transmission of the random access data to base station 10 in step 413.

As for the method of transmitting a transmission continuation request signal, a method of embedding the transmission continuation request signal at some midpoint of the random access data using a radio channel used to transmit the random access data (FIG. 4 and FIG. 5) or a method using a different radio channel (radio channel determined by a spreading code or frequency used) may be used.

When the transmission continuation request signal is received from mobile station 20 in step 414, base station 10 judges whether or not to permit a continuation of transmission of the random access data depending on the current communication situation in step 415 and transmits a transmission continuation permission signal or transmission continuation rejection signal to mobile station 20 depending on the judgment result in steps 416 and 417.

In the judgment in step 415, the current communication situation can be judged using the following information (1) to (3), for example. However, all the following information need not always be used and any one of them may be used.

(1) Reception situation of a transmission start request signal from another mobile station 20

(2) Reception quality of random access data received from mobile station 20

(3) Amount of random access data received so far from mobile station 20

The case using (1) assumes a judgment that transmission continuation will not be permitted when a transmission start request signal is received from another mobile station 20 a predetermined number of times or more per unit time and transmission continuation will be permitted otherwise.

The case using (2) assumes a judgment that reception quality is judged to be bad and transmission continuation will not be permitted when the error rate of random access data received from mobile station 20 reaches or exceeds a predetermined value and transmission continuation will be permitted otherwise.

The case using (3) assumes a judgment that the radio channel is excessively occupied and transmission continuation will not be permitted when the amount of random access data received from mobile station 20 reaches or exceeds a predetermined data length and transmission continuation will be permitted otherwise.

Upon receiving a transmission continuation permission signal from base station 10 in step 418, mobile station 20 continues to transmit random access data of a predetermined data length to base station 10 even after the transmission of the random access data of a predetermined data length currently being transmitted is completed in step 419. If there still remains random access data of a predetermined data length or longer in mobile station 20 even after the transmission of the random access data of the predetermined data length is completed, mobile station 20 transmits a transmission continuation request signal to base station 10 once again.

On the other hand, when a transmission continuation rejection signal is received from base station 10 in step 420 (in the case of situation [a] in FIG. 4) or when a transmission continuation permission signal cannot be received from base station 10 after a lapse of a predetermined time in step 421 (in the case of situation [b] in FIG. 5), mobile station 20 stops transmission of the random access data after transmission of the random access data of the predetermined data length currently being transmitted is completed in step 422.

When the random access data that still remains in mobile station 20 after the transmission of the random access data of the predetermined data length currently being transmitted is completed is less than the predetermined length, mobile station 20 does not transmit any transmission continuation request signal to base station 10, transmits all the remaining random access data in step 423 and completes transmission of the random access data (in the case of situation [c] in FIG. 5).

Hereinafter, the configurations of base station 10 and mobile station 20 which realize the above described operations will be explained.

Figure 7:
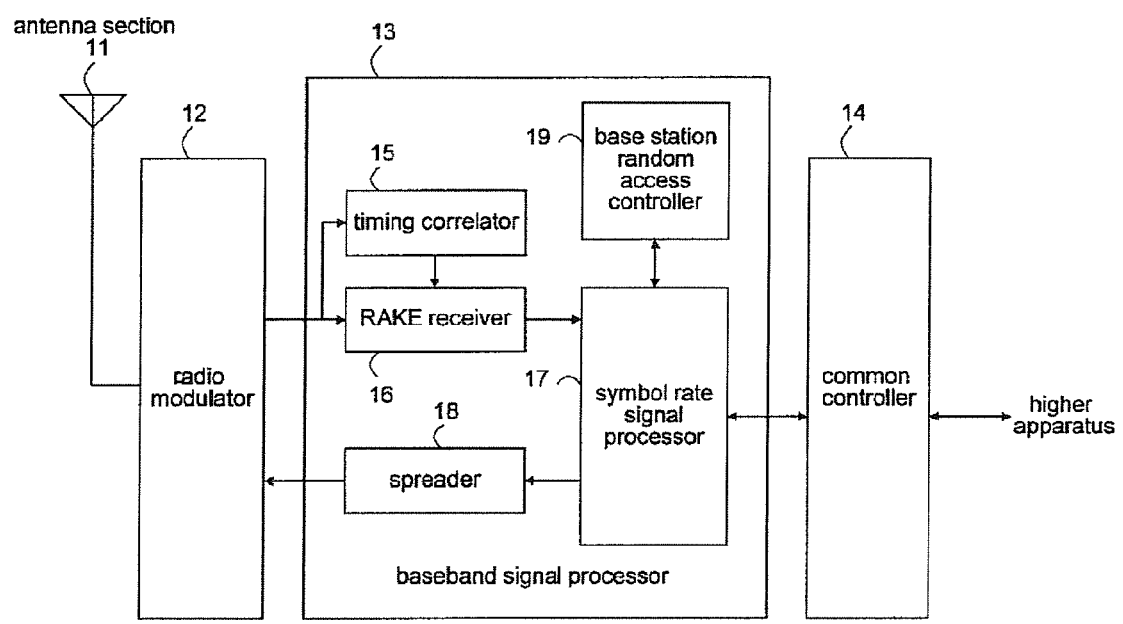
FIG. 7 is a block diagram showing the configuration of the base station shown in FIG. 3.

FIG. 7 is a block diagram showing the configuration of base station 10 shown in FIG. 3.

Referring to FIG. 7, base station 10 has antenna section 11, radio modulator 12, baseband signal processor 13 and common controller 14. Furthermore, baseband signal processor 13 has timing correlator 15, RAKE receiver 16, symbol rate signal processor 17, spreader 18 and base station random access controller 19.

That is, base station 10 has the configuration in which base station random access controller 19 is added to the basic configuration of a general base station based on a COMA scheme.

Antenna section 11, radio modulator 12, timing correlator 15, RAKE receiver 16, symbol rate signal processor 17 and spreader 18 constitute a base station communication section which carries out radio communication with mobile station 20.

Base station random access controller 19 receives a transmission start request signal and a transmission continuation request signal transmitted from mobile station 20 and performs transmission control of a transmission start permission signal/transmission start rejection signal, transmission continuation permission signal/transmission continuation rejection signal based on various kinds of information.

In base station 10 configured as shown above, various types of signals (transmission start permission signal, transmission start on signal or the like) transmitted from mobile station 20 are received by antenna section 11, demodulated into a baseband signal by radio modulator 12 and then subjected to detection processing by timing correlator 15. When a signal is detected, information of the detection is notified to base station random access controller 19 via RAKE receiver 16 and symbol rate signal processor 17. Base station random access controller 19 instructs symbol rate signal processor 17 to transmit signals that are selected for transmission to mobile station 20 (transmission start permission signal, transmission start rejection signal, transmission continuation permission signal and transmission continuation rejection signal). These signals are converted to code strings which make up the signals in question at symbol rate signal processor 17, are subjected to spreading processing at spreader 18, are subjected to modulation processing at radio modulator 12 and then are transmitted from antenna section 11 to mobile station 20.

Furthermore, random access data transmitted from mobile station 20 is received at antenna section 11 and demodulated into a baseband signal at radio modulator 12, and then subjected to detection processing at timing correlator 15. Path timing information of the random access data is set in RAKE receiver 16. After that, the random access data is subjected to despreading processing and path diversity reception processing at RAKE receiver 16, is subjected to error correcting processing and de-interleaving processing or the like at symbol rate signal processor 17 and then is sent to a higher apparatus via common controller 14.

Figure 8:
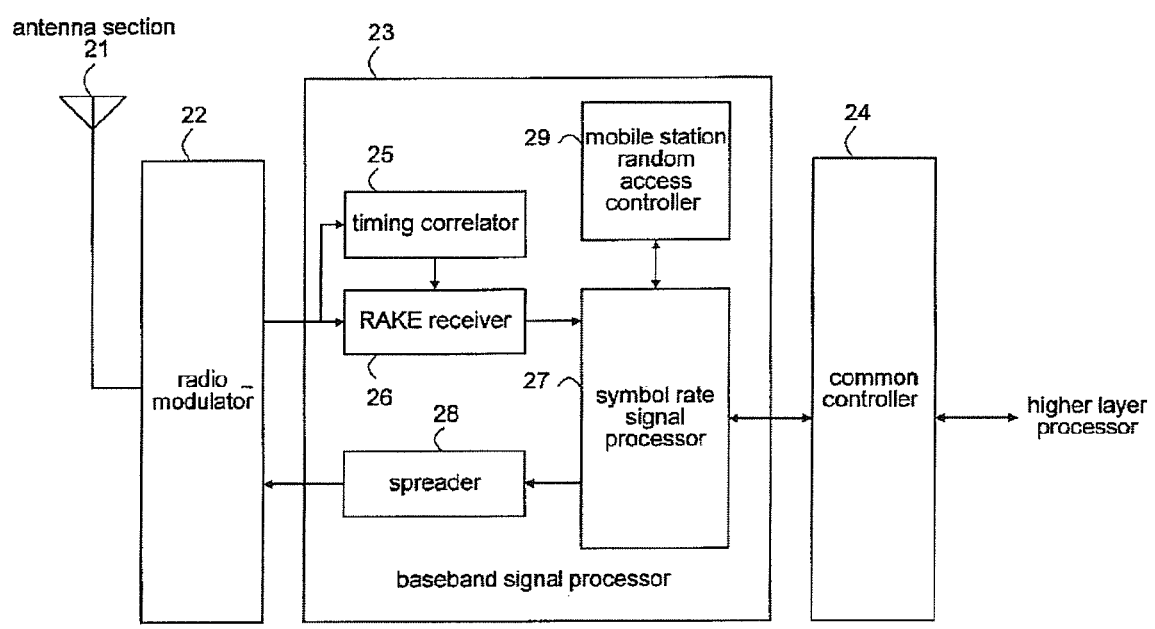
FIG. 8 is a block diagram showing the configuration of the mobile station shown in FIG. 3.

FIG. 8 is a block diagram showing the configuration of mobile station 20 shown in FIG. 3

Referring to FIG. 8, mobile station 20 has antenna section 21, radio modulator 22, baseband signal processor 23 and common controller 24. Furthermore, baseband signal processor 23 has timing correlator 25, RAKE receiver 26, symbol rate signal processor 27, spreader 28 and mobile station random access controller 29.

That is, mobile station 20 a configuration in which mobile station random access controller 29 is added to the basic configuration of a general mobile station based on a COMA scheme.

Antenna section 21, radio modulator 22, timing correlator 25, RAKE receiver 26, symbol rate signal processor 27 and spreader 28 constitute a mobile station communication section which carries out radio communication with base station 10.

Mobile station random access controller 29 receives a transmission start permission signal/transmission start rejection signal and transmission continuation permission signal/transmission continuation rejection signal transmitted from base station 10 and performs transmission controls on the transmission start request signal, transmission continuation request signal and random access data based on various kinds of information.

As for mobile station 20 configured as shown above, various signals transmitted from base station 10 (transmission start permission signal, transmission start rejection signal, transmission continuation permission signal, transmission continuation rejection signal or the like) are received at antenna section 21 demodulated into a baseband signal at radio modulator 22, and then subjected to detection processing at timing correlator 25. When a signal is detected, the information of the detection is notified to mobile station random access controller 29 via RAKE receiver 26 and symbol rate signal processor 27. Mobile station random access controller 29 instructs symbol rate signal processor 27 to transmit the signals that are selected for transmission to base station 10 (transmission start request signal, transmission continuation request signal or the like) and to transmit the random access data received via common controller 24 from a higher layer processor. These signals or the like are converted to code strings that make up the signals in question at symbol rate signal processor 27, are subjected to spreading processing at spreader 28, are subjected to modulation processing at radio modulator 22 and then are transmitted from antenna section 21 to base station 10.

As described above, according to the random access communication method shown in FIG. 1 and FIG. 2, the mobile station must exchange signals that permit/reject a transmission start with the base stations every time it transmits random access data of a predetermined data length to the base station, and therefore wasteful delays are produced during transmission of the random access data.

On the other hand, according to this exemplary embodiment, mobile station 20 transmits a transmission continuation request signal to base station 10 during transmission of the random access data, base station 10 judges whether or not to permit transmission continuation depending on the current communication situation, transmits a transmission continuation permission signal to mobile station 20 when transmission continuation is permitted, and when the transmission continuation permission signal is received from base station 10, mobile station 20 continues transmission of the random access data.

Therefore, it is possible to make variable the data length of random access data transmitted from mobile station 20 to base station 10 depending on the current communication situation, and thereby also to continuously transmit random access data, for example, from mobile station 20 to base station 10.

Therefore, it is possible to efficiently use a radio channel for random access and thereby minimize wasteful delays produced in the mobile communication system shown in FIG. 1 and FIG. 2.

The present invention is not limited to the above described cellular phone system and is also applicable to mobile communication systems based on other schemes. Furthermore, since a feature of the present invention lies in control over "transmission continuation" of random access data, the present invention is also applicable to such a communication scheme in which random access data is transmitted abruptly without control over "transmission start" at a preceding stage thereof.

While the invention has been particularly shown and described with reference to exemplary embodiments thereof the invention is not limited to these exemplary embodiments. It will be understood by those of ordinary skill in the art that various changes in form and details may be made therein without departing from the spirit and scope of the present invention as defined by the claims.

What is claimed is:

1. A random access communication method in a mobile communication system made up of a base station and a plurality of mobile stations which carry out random access communication with the base station, comprising:

the mobile station transmitting a transmission continuation request signal which requests a continuation of transmission of the random access data to the base station during transmission of the random access data;

the base station judging, when the transmission continuation request signal is received from the mobile station, whether or not to permit the continuation of transmission of the random access data depending on the current communication situation;

the base station transmitting a transmission continuation permission signal or a transmission continuation rejection signal to the mobile station depending on whether or not to permit the continuation of transmission of the random access data; and the mobile station continuing, when the transmission continuation permission signal is received from the base station, transmission of the random access data, wherein the base station is to not permit the continuation of transmission of the random access data by the mobile station responsive to receiving the transmission continuation request signal from the mobile station where one or more of:

a transmission start request signal has been received from a different mobile station a predetermined number of times or more during a predetermined period of time;

an amount of the random access data already transmitted to the base station from the mobile station has reached or exceeded a predetermined threshold amount.

2. The random access communication method according to claim 1, wherein the transmission continuation request signal is transmitted using a radio channel other than the radio channel used for transmission of the random access data.

3. The random access communication method according to claim 1, wherein the transmission continuation request signal is transmitted embedded at some midpoint of the random access data using the radio channel used to transmit the random access data.

4. A mobile communication system comprising:

a base station; and a plurality of mobile stations which carry out a random access communication with the base station;

wherein the mobile station comprising:

a mobile station communication section for carrying out a radio communication with the base station: and mobile station random access controller for controlling the mobile station communication section during transmission of the random access data, for transmitting a transmission continuation request signal which requests a continuation of transmission of the random access data to the base station, for controlling, when the mobile station communication section receives a transmission continuation permission signal which permits the continuation of transmission of the random access data from the base station, the mobile station communication section to continue transmission of the random access data, and the base station comprising:

a base station communication section which carries out a radio communication with the mobile station; and a base station random access controller which judges, when the base station communication section receives the transmission continuation request signal from the mobile station, whether or not to permit a continuation of transmission of the random access data based on the current communication situation, controls the base station communication section depending on whether or not to permit the transmission continuation, and transmits a transmission continuation permission signal or a transmission continuation rejection signal to the mobile station, wherein the base station is to not permit the continuation of transmission of the random access data by the mobile station responsive to receiving the transmission continuation request signal from the mobile station where one or more of:
- a transmission start request signal has been received from a different mobile station a predetermined number of times or more during a predetermined period of time;
- an amount of the random access data already transmitted to the base station from the mobile station has reached or exceeded a predetermined threshold amount.

5. The mobile communication system according to claim 4, wherein the mobile station random access controller controls the mobile station communication section and transmits the transmission continuation request signal using a radio channel other than the radio channel used for transmission of the random access data.

6. The mobile communication system according to claim 4, wherein the mobile station random access controller controls the mobile station communication section and transmits the transmission continuation request signal embedded at some midpoint of the random access data using the radio channel used for transmission of the random access data.

7. A mobile communication system comprising:
  a base station; and
  a plurality of mobile stations which carry out a random access communication with the base station;
  wherein the mobile station comprising:
  mobile station communication means for carrying out a radio communication with the base station; and
  mobile station random access control means for controlling the mobile station communication means during transmission of the random access data, for transmitting a transmission continuation request signal which requests a continuation of transmission of the random access data to the base station, for controlling, when the mobile station communication means receives a transmission continuation permission signal which permits the continuation of transmission of the random access data from the base station, the mobile station communication means to continue transmission of the random access data, and the base station comprising:
base station communication means for carrying out a radio communication with the mobile station; and
base station random access control means for judging, when the base station communication means receives the transmission continuation request signal from the mobile station, whether or not to permit a continuation of transmission of the random access data based on the current communication situation, controlling the base station communication means depending on whether or not to permit the transmission continuation, and transmitting a transmission continuation permission signal or a transmission continuation rejection signal to the mobile station, wherein the base station is to not permit the continuation of transmission of the random access data by the mobile station responsive to receiving the transmission continuation request signal from the mobile station where one or more of:
- a transmission start request signal has been received from a different mobile station a predetermined number of times or more during a predetermined period of time;
- an amount of the random access data already transmitted to the base station from the mobile station has reached or exceeded a predetermined threshold amount.

\* \* \* \* \*